July 6, 1965   L. W. HAHN   3,193,087
CONVEYOR ASSEMBLY
Filed Aug. 5, 1963   8 Sheets-Sheet 1
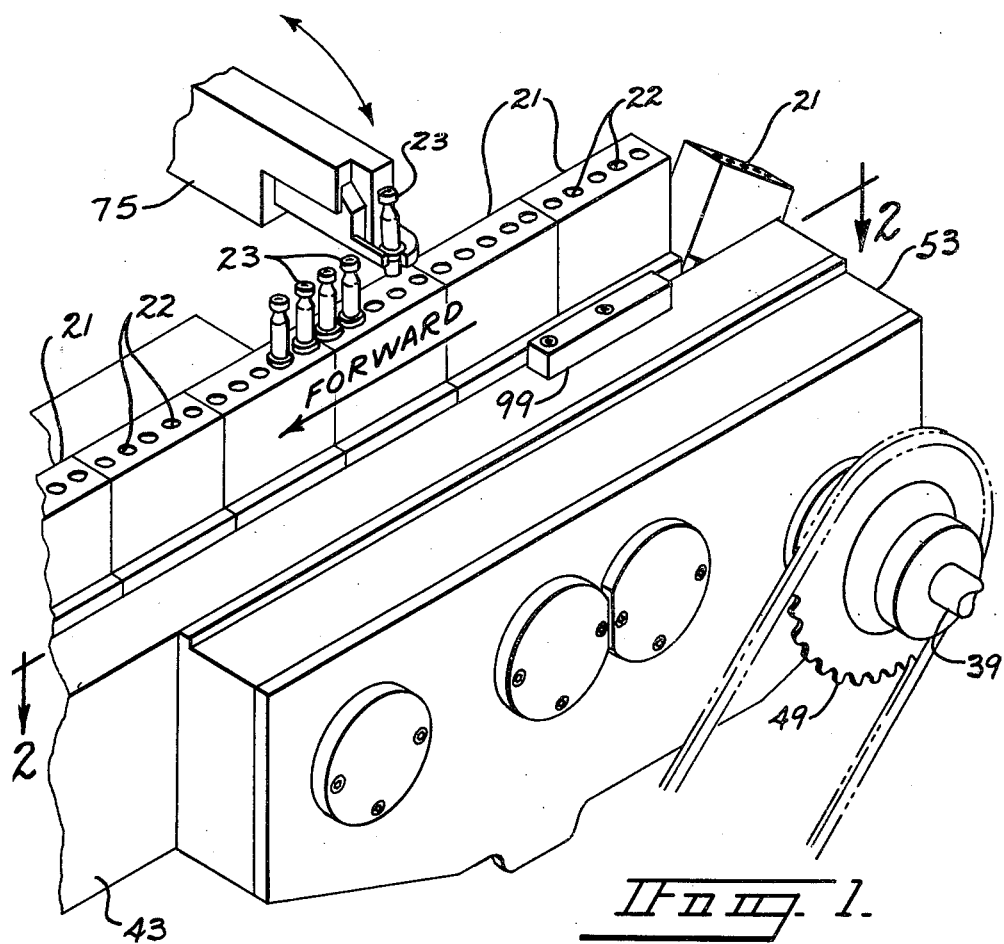
Fig. 1.
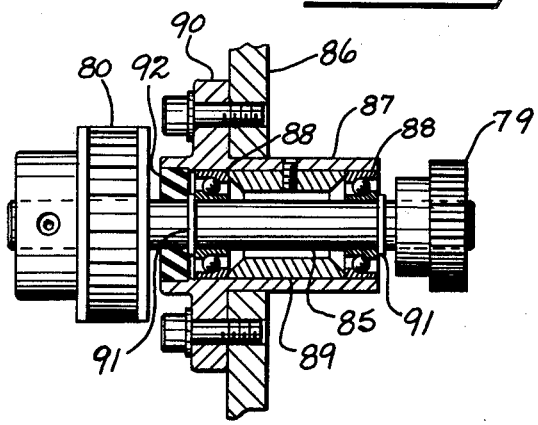
Fig. 10.
INVENTOR.
LOUIS W. HAHN
BY 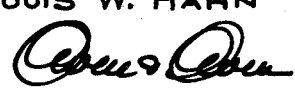
ATTORNEYS

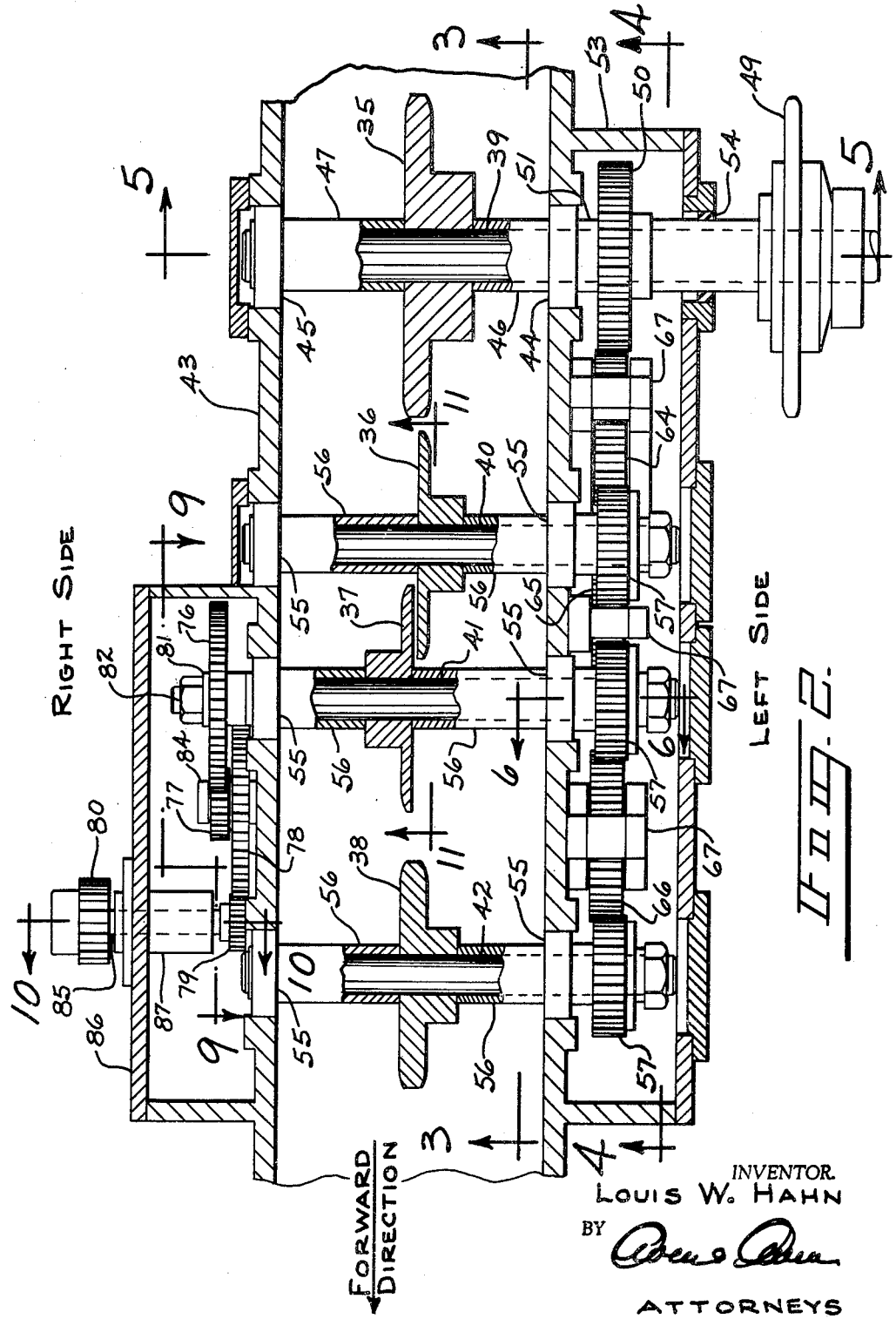

July 6, 1965 L. W. HAHN 3,193,087
CONVEYOR ASSEMBLY
Filed Aug. 5, 1963 8 Sheets-Sheet 3
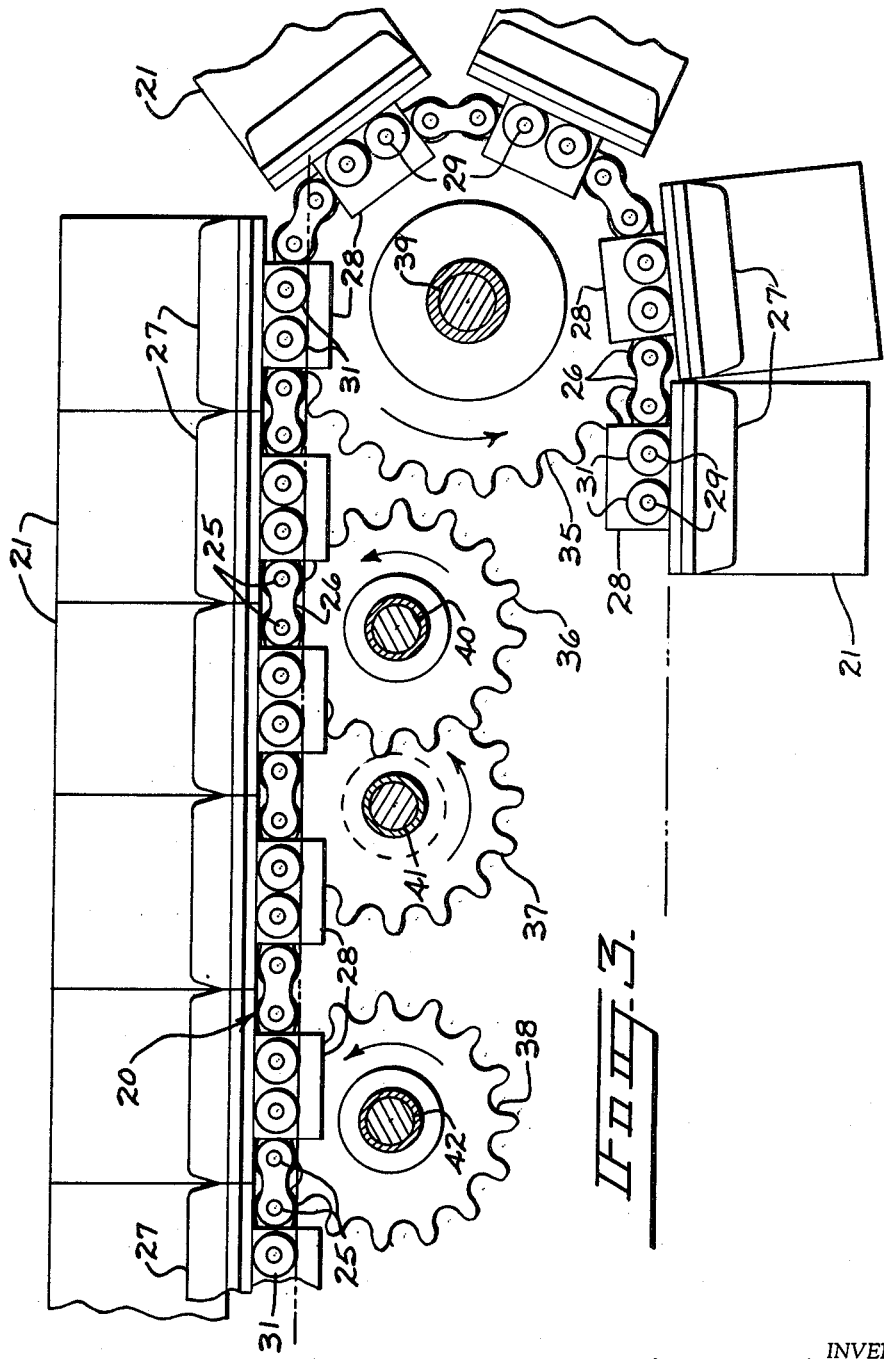
INVENTOR.
LOUIS W. HAHN
BY
ATTORNEYS

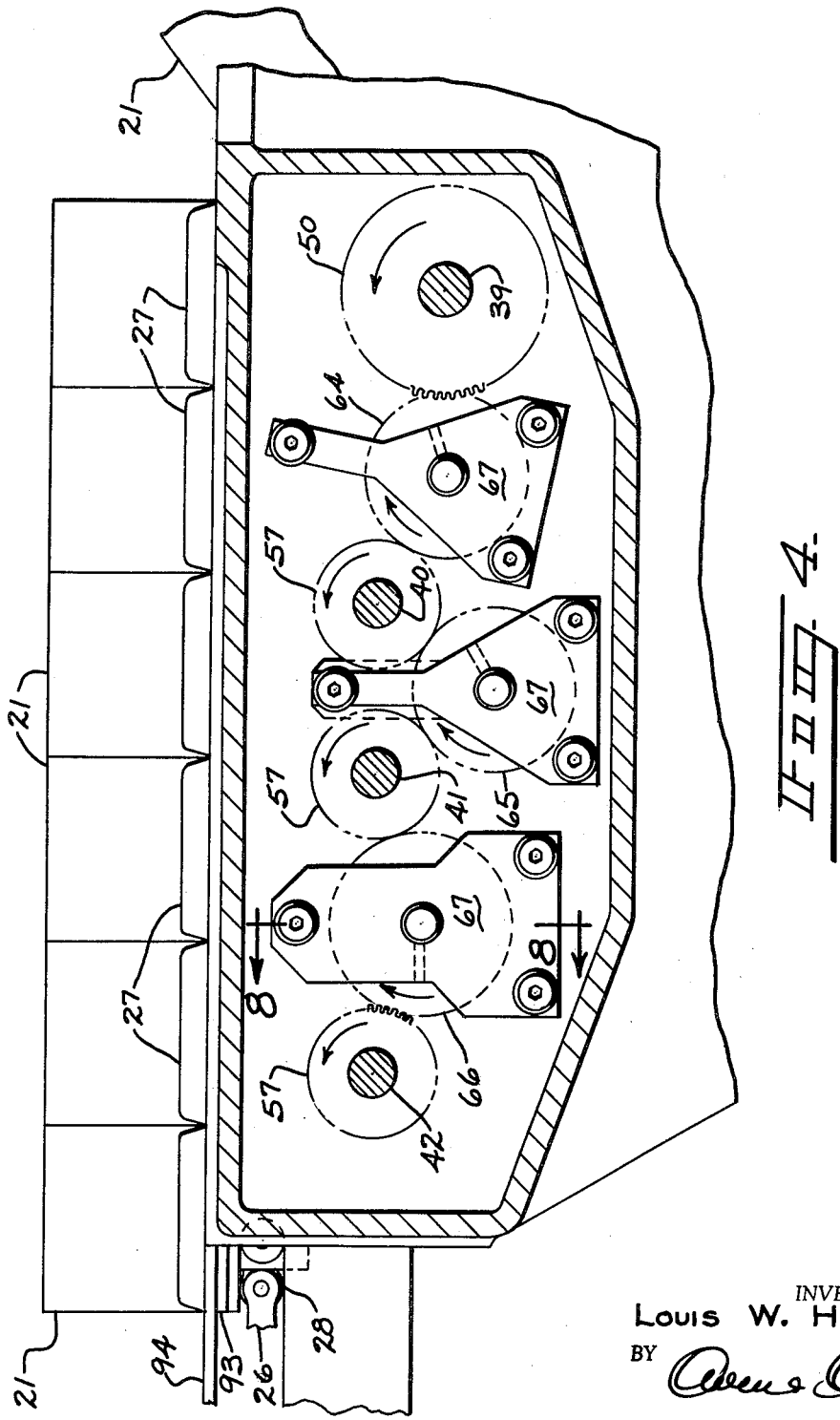

INVENTOR.
LOUIS W. HAHN
BY
ATTORNEYS

United States Patent Office 3,193,087
Patented July 6, 1965

3,193,087
CONVEYOR ASSEMBLY
Louis W. Hahn, Detroit, Mich., assignor to Champion Spark Plug Company, Toledo, Ohio, a corporation of Delaware
Filed Aug. 5, 1963, Ser. No. 299,970
7 Claims. (Cl. 198—203)

The present invention relates to chain conveyors of the type which transport work holders past a work transfer station with great evenness and accuracy.

Chain conveyors are sometimes used to transport work holders that are loaded with work pieces at one location and that are unloaded from the holders at another location. It sometimes is necessary that the work pieces be positioned in the holders with great accuracy, and that the work holder arrive at the work transfer station, be it a loading or an unloading station, at the same instant as does the loading or unloading mechanism. Under such circumstances the speed of the conveyor must be synchronized with that of the loading or unloading mechanism, as the case may be. Uneven chain wear of the conveyor, however, causes fluctuations in the speed of movement of the individual conveyor links past the work transfer station which must be compensated for if synchronization is to be achieved.

An object of the present invention is the provision of a new and improved link positioning mechanism for a chain type conveyor which will feed the individual links of the conveyor to a work transfer station at a uniform rate.

A further object of the invention is the provision of a mechanism of the above mentioned type having improved means for synchronizing conveyor loading or unloading mechanism with the feeding of the individual links of the conveyor past the work transfer station.

The invention resides in certain constructions and combinations and arrangements of parts; and further objects and advantages of the invention will become apparent to those skilled in the art to which it relates from the following description of the preferred embodiment described with reference to the accompanying drawings forming a part of this specification, and in which:

FIG. 1 is an isometric view of a conveyor structure at a work transfer station showing mechanism that is used to load work pieces into work carrier structures tha are part of a conveyor—the view further showing a sprocket box that houses mechanism for accurately feeding the work carriers past the loading station;

FIG. 2 is a horizontal sectional view through the sprocket box shown in FIG. 1;

FIG. 3 is a vertical sectional view taken approximately on the line 3—3 of FIG. 2;

FIG. 4 is a vertical sectional view taken approximately on the line 4—4 of FIG. 2;

FIG. 6 is a fragmentary vertical sectional view taken approximately on the line 6—6 of FIG. 2;

FIG. 7 is a sectional view taken approximately on the line 7—7 of FIG. 6;

FIG. 8 is a sectional view taken approximately on the line 8—8 of FIG. 4;

Figure 5:
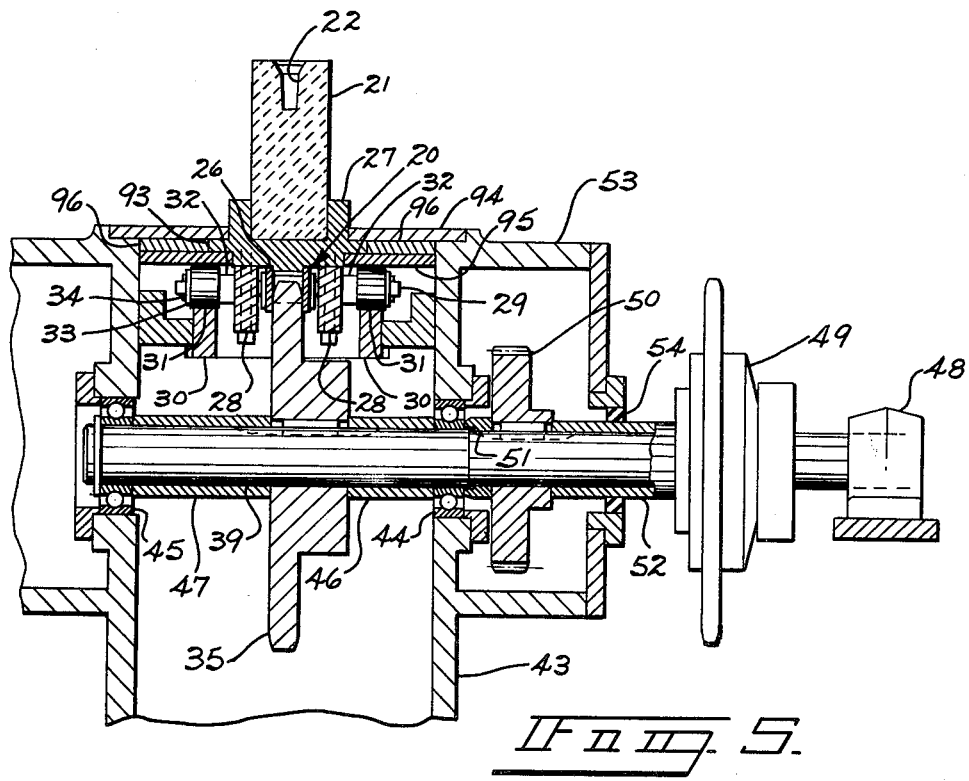
FIG. 5 is a vertical sectional view taken approximately on the line 5—5 of FIG. 2.
Figure 9:
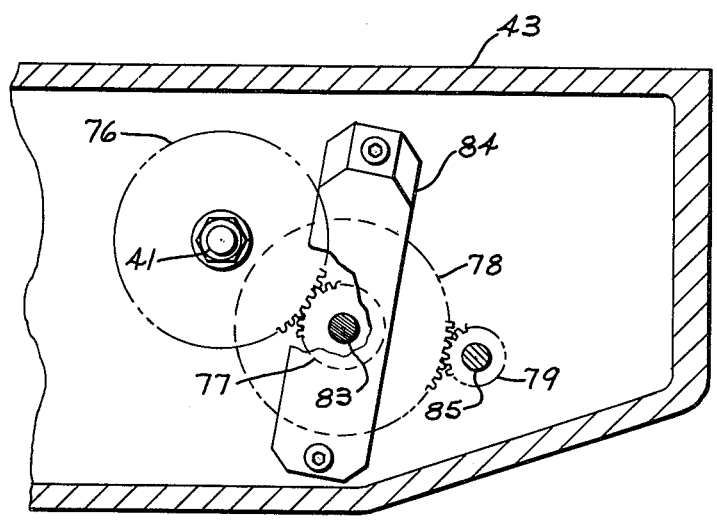
FIG. 9 is a vertical sectional view taken approximately on the line 9—9 of FIG. 2.
Figure 10:
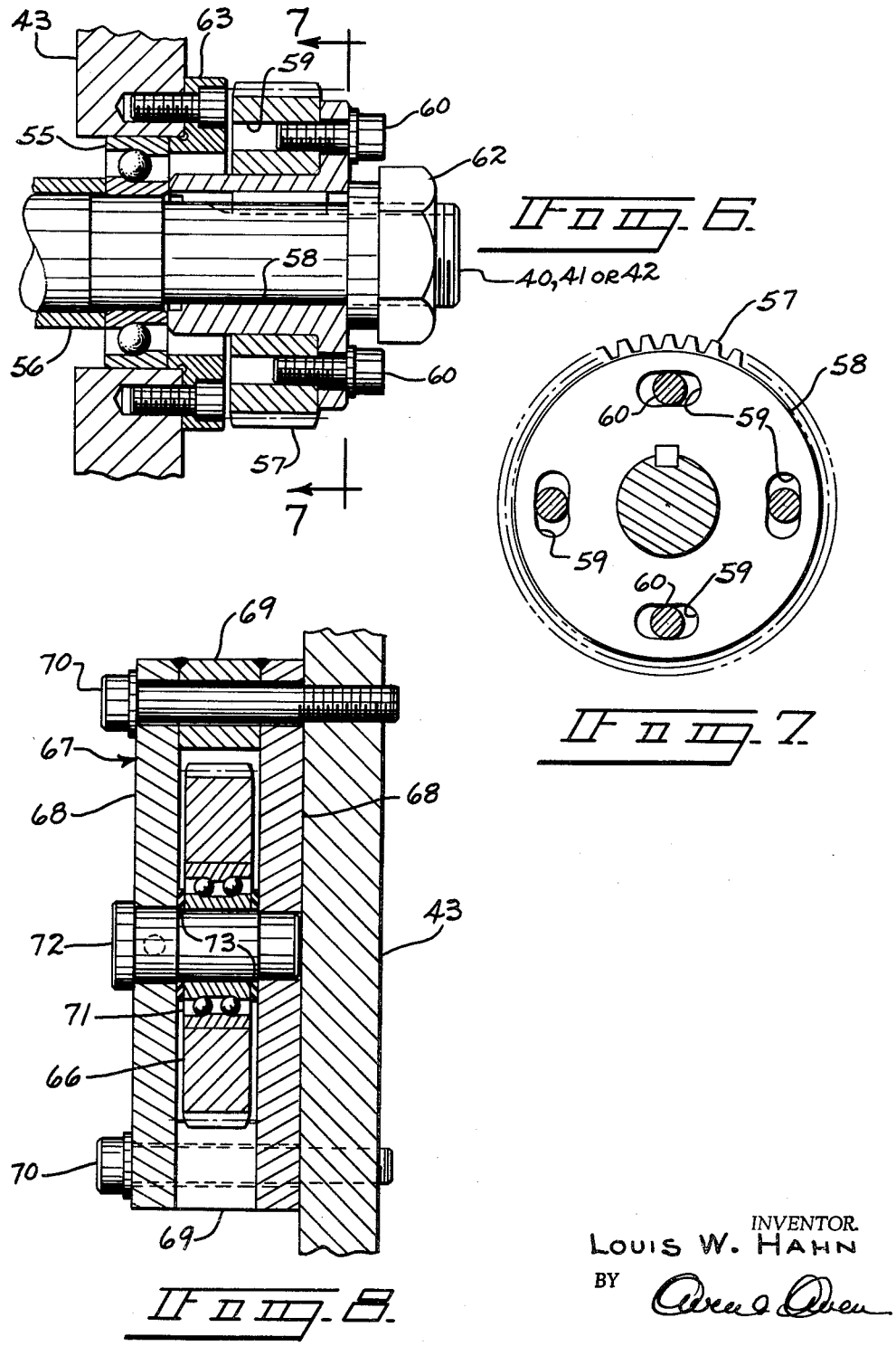
FIG. 10 is a vertical sectional view taken approximately on the line 10—10 of FIG. 2.

There is shown in the drawings a chain conveyor 20 having block shaped work carriers 21 thereon which have vertical openings 22 adapted to receive generally cylindrical work pieces 23 therein. The chain conveyor is of the type having rollers 24 (see FIG. 11) supported on transverse pins 25 which are spaced apart and held by pairs of side links 26. Members of one pair of links 26 are positioned on opposite sides of a roller 24 and extend rearwardly to a trailing pin 25 while members of another pair of links 26 are positioned on opposite sides of the same roller 24 and extend forwardly to the next leading pin 25. Four links, therefore, are connected to each pin 25. The work carriers 21 are carried on support castings 27, see FIG. 5, having a pair of depending legs 28 bolted thereto which straddle the chain 20. The support castings 27 are in turn fastened to the chain 20 by a pair of long pins 29 which replace a pair of adjacent conventional pins 25. The depending legs 28 take the place of every fourth link 26 as can be seen in FIG. 3, and a cross section of the structure can be seen in FIG. 5. Members of a pair of support rails 30 are positioned on opposite sides of chain 20 outwardly of the depending legs 28 and a pair of rollers 31 are provided on each pin 29 to ride upon the rails 30. Annular spacers 32 are provided on the pins 29 between the rollers 31 and depending legs 28, washers 33 are provided outwardly of the rollers 31, and the washers are held in place by cotter pins 34.

The chain conveyor 20 passes around a tail sprocket 35 and extends forwardly over feed sprockets 36, 37 and 38 on its way to a head pulley, not shown. The particular conveyor structure shown is adapted to be loaded with cylindrical work pieces 23 at a location between sprockets 36 and 37, see FIG. 11, and it is the purpose of sprockets 35, 36, 37 and 38 to feed individual work carriers 21 past the loading station at an absolutely uniform velocity.

The four sprockets 35, 36, 37 and 38 are keyed to shafts 39, 40, 41 and 42 respectively which extend between opposite sides of a cast sprocket box 43. The end sprockets 35 and 38 have a width corresponding to that of the chain rollers 24 and so fill the spaces between the side links 26. The two center sprockets 36 and 37, however, overlap each other or extend past each other. For this reason, sprockets 36 and 37 each have a width slightly less than one-half the width of the chain rollers 24, and are approximately half as wide as sprockets 35 and 38. Shaft 39 is journaled in anti-friction bearings 44 and 45 positioned in opposite sides of the sprocket box 43. Tubular spacers 46 and 47 are positioned about the shaft 39 between the sprocket 35 and the inner races of bearings 44 and 45 respectively to hold the sprocket 35 centered between the bearings 44 and 45. The shaft 39 projects outwardly of the left side of the sprocket box 43, and its outer end is journalled in a pillow block 48. A driving clutch type sprocket 49 is positioned just inwardly of the pillow block 48, and a synchronizing gear 50 is keyed to the shaft 39 adjacent the side of the sprocket box 43. An annular spacer 51 spaces the synchronizing gear 50 from the bearing, and another annular spacer 52 spaces the synchronizing gear 50 from the drive sprocket 49. The sprocket box structure 43 includes a smaller gear box structure 53 on its left side [1] in which the synchronizing gear 50 is positioned and a dirt seal 54 is positioned around the spacer 52 on the shaft 39.

The shafts 40, 41 and 42 are each journaled in the sprocket box 43 by means of a pair of anti-friction bear-

[1] Left side—when viewed in the forward direction of the work transfer surface of the conveyor.

ings 55, and the sprockets 36, 37 and 38 are positioned for engagement by the chain conveyor 20 by pairs of tubular spacer members 56. The spacer members 56 are positioned between the bearings 55 and the respective sprockets and are of appropriate lengths as to provide running clearance between sprockets 36 and 37 while causing each of the sprockets to properly mesh with the chain conveyor 20. The left side of each shaft 40, 41 and 42 extends into the gear box 53 where each is provided with a gear 57, see FIGS. 2, 6 and 7. The gears 57 are made angularly adjustable relative the sprockets that are affixed to the same shaft. Each gear 57 is positioned on a bushing 58 which is keyed to the respective shaft. Each bushing 58 has a flange positioned against the outer side face of a gear 57, and each flange is provided with four elongated bolt holes 59 through which machine screws 60 are threaded into the gear 57 mounted thereon. Each bushing 58 is held in place by a nut 62, and the adjacent bearing 55 is held in place by an annular retainer 63 which is fastened to the sprocket box 43 by machine screws.

As previously indicated sprockets 35 through 38 are driven at the same pitch velocity by means of gears 50 and 57. Gear 50 drives gear 57 on shaft 40 through idler 64, gear 57 on shaft 40 drives gear 57 on shaft 41 through idler 65, and gear 57 on shaft 41 drives gear 57 on shaft 42 through idler 66. Each of the idlers 64, 65 and 66 are secured to the sprocket box 43 by means of a triangularly shaped bracket 67, best seen in FIGS. 4 and 8. Since the brackets 67 are substantially identical, only the brackets for idler 66 will be described in detail.

The bracket 67 is made from a pair of triangularly shaped plates 68, one of which is positioned inwardly of the idler gear 66 against the side of sprocket box 43, and the other of which is positioned outwardly of the idler gear 66. The plates 68 are spaced apart by means of three annular spacers 69 located generally at the corners of the plates 68 and through which machine screws 70 extend and are screwed into the sprocket box 43. The idler gear 66 is pressed upon an antifriction bearing 71 which in turn is carried by a pin 72 that is pressed into aligned holes in the plates 68. A pair of annular spacers 73 center the antifriction bearing 71 between the plates 68.

As previously indicated the gears 57 are made adjustable on the shaft 40, 41 and 42 in order that all slack in the sections of conveyor chain 20 between the sprockets 35 through 38 can be taken out. The machine screws 60 are loosened and a section of unworn conveyor chain is placed over the sprockets 35 through 38 and drawn tight. When the slack has been taken out of the section of conveyor chain 20, the machine screws 60 are tightened to lock the drive gears 57 in proper relationship to the sprockets 36 through 38. In actual operation the driven tail pulley 35 pulls the bottom run of conveyor chain around the head sprocket, not shown, to apply tension on the chain between the head sprocket and the feed sprocket 38. This tension is, thereafter, removed from the section of conveyor chain 20 between the feed sprocket 38 and the tail sprocket 35, and the forces on the main length of chain are transferred through the gears 57, 66, 65, 64 and 50 to the tail sprocket 35 because substantially the whole length of chain is kept under tension ahead of the lead sprocket 38, sections of chain having uneven wear are not alternately placed into and taken out of the length of chain that is pulling against the lead sprocket 38 to affect the speed of rotation of the lead sprocket 38.

Figure 11:
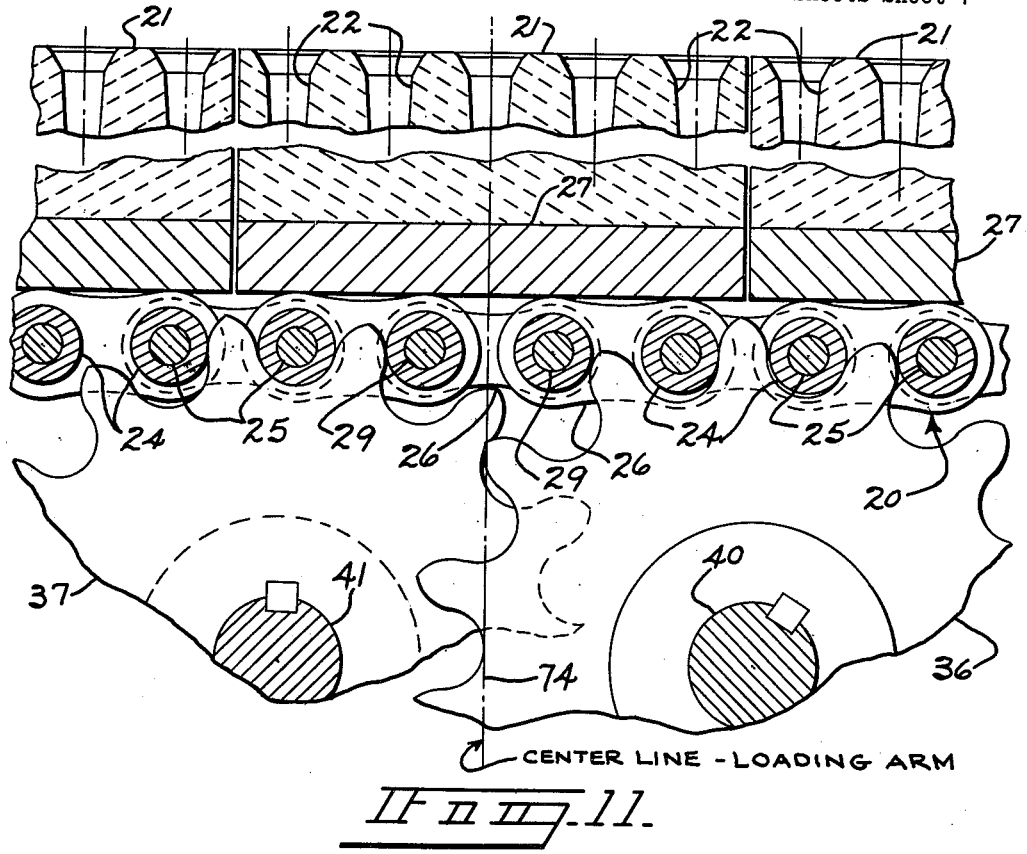
FIG. 11 is a fragmentary vertical sectional view taken approximately on the line 11—11 of FIG. 2.
Figure 12:
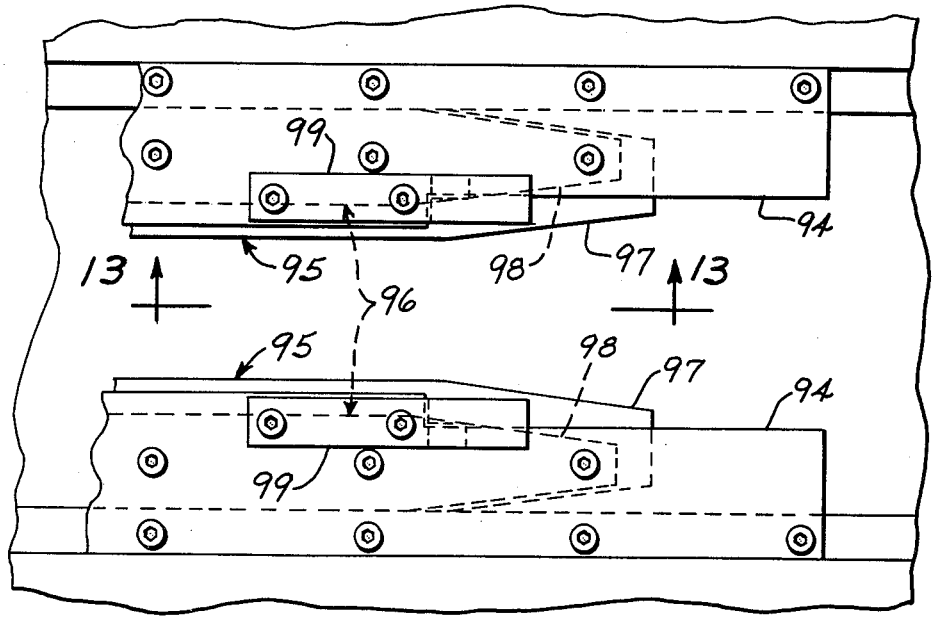
FIG. 12 is a fragmentary plan view of the sprocket box adjacent the tail sprocket and with the conveyor structure removed to better show the guide structure for the work carriers.
Figure 13:
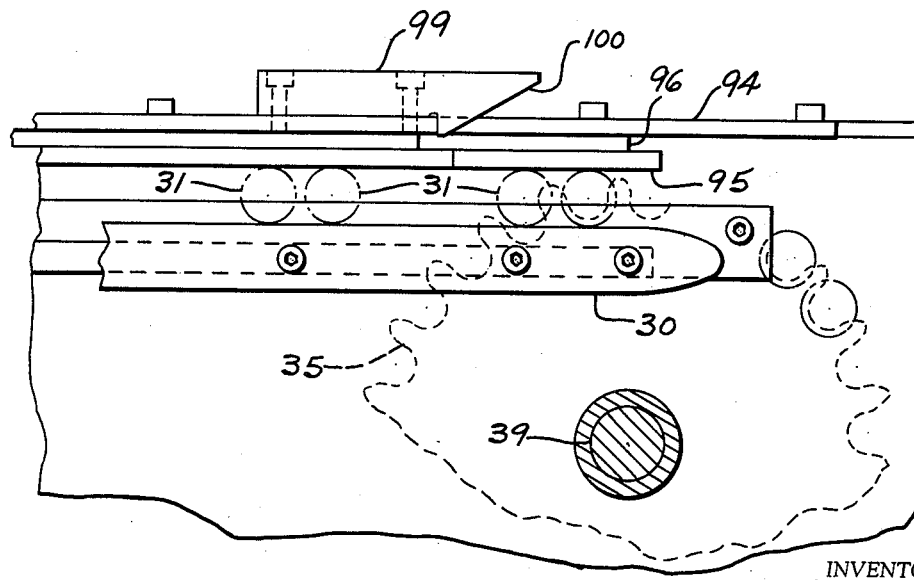
FIG. 13 is a fragmentary sectional view taken approximately on the line 13—13 of FIG. 12.

According to the present invention, therefore, forces tending to separate the individual links between the lead sprocket 38 and tail sprocket 35 are removed. Sprockets 36 and 37 are provided to accurately move the individual links to which the work carriers 21 are attached past the center line 74 of the work transfer station shown in FIG. 11. Each of the sprockets 35 through 38 are provided with rack teeth, so that there is no clearance between the teeth and rollers 24 at the pitch line of the sprockets. It is desired that both a leading surface and a trailing surface of at least one roller 24 carried by the pair of pins 29 to which a work holder 21 is attached be abutted by a trailing edge and a leading edge respectively of teeth of the sprockets 36 and 37 to accurately position the work holder as one of its vertical work receiving openings moves past the work transfer station. When the pins 29 are positioned over one of the sprockets 36 and 37 a single tooth of the respective sprockets fits between the pins 20 to abut their rollers 24 and thereby accurately position the work carrier 21. When the pins 29 are between the sprockets 36 and 37, a single tooth no longer can be positioned between the rollers. Such a condition is shown in FIG. 11, and at this time it will be seen that a trailing edge of a tooth of sprocket 37 contacts the leading edge of a roller 24 which surrounds the leading pin 29, while a leading surface of a tooth on sprocket 36 contacts the trailing edge of the roller 24 which surrounds the trailing pin 29. Accurate positioning of the work holder 21 at all times therefore is provided.

In addition to accurately moving the work carriers 21 past the work transfer station, it is important that the cooperating transfer mechanism which in the present instance is a conveyor loading device 75 be synchronized exactly with the movement of the work carriers 21 past the loading station. Synchronism in the present instance is obtained by means of a gear train comprising gears 76, 77, 78, 79 and timing belt pulley 80 which are operated from the shaft 41 to which sprocket 37 is attached. The timing belt pulley 80 in the present instance does not drive the conveyor loading device 75 directly but drives a selsyn, not shown, which controls the speed of the driving mechanism for the conveyor loading device 75. The gear 76 is fastened to the right hand end of shaft 41 by means of a lock washer 81 and nut 82. Gear 77 which meshes with the gear 76 is mounted on a common shaft 83 with gear 78. One end of shaft 83 is journaled in the sprocket box 43, and the other end is journaled in a bracket 84 that is bolted to the sprocket box 43 through suitable spacers not shown. Gear 79 and timing belt pulley 80 are secured to opposite ends of a shaft 85 which projects through a cover 86 that is bolted to the sprocket box 43 over the gearing 76 through 79. The shaft 85 is journaled in a flanged annular sleeve 87 by means of a pair of bearings 88 separated by an annular spacer 89 through which the shaft 85 extends. The flange 90 of the sleeve 87 is bolted to the cover 86, and endwise movement of the shaft 85 is prevented by a pair of snap rings 91 which are seated in grooves on the shaft 85 and abut the bearings 88. A dirt seal 92 is provided between the shaft 85 and sleeve 87 outwardly of the outboard bearing 88.

The work carriers 21 must be positioned accurately laterally and vertically of the work transfer station as well as longitudinally of the conveyor. This is accomplished by means of a pair of lateral ears 93 on the support castings 27 (FIG. 5) which slide between pairs of top and bottom plates 94 and 95 respectively, which are spaced apart a distance corresponding to the height of the ears 93 by a pair of spacer plates 96. Lateral alignment of the support castings 27 is provided by sliding engagement between the side surfaces of the ears 93 and spacer plates 96, as well as between the bottom side surfaces of the support castings 27 and the plates 95. The plates 95 and 96 start a short distance forwardly of the tail sprocket 35 and have side edges 97 and 98 respectively which are beveled to cam the support castings 27 between the side surfaces of the plates 95 and 96. The ears 93 are cammed downwardly between the plates 94 and 95 by means of a pair of camming members 99 that are bolted in place adjacent the beginning of plate 94 and which have a rear camming surface 100 which extends downwardly and forwardly to beneath the plate 94.

If the ears 93 do not lay flat on the plate 95 after passing around the tail sprocket 35 before they reach camming member 99, they engage the rear camming surfaces 100 and are caused to slide between the plates 94 and 95.

It will be apparent that the objects heretofore enumerated as well as others have been accomplished and that there has been provided a device for feeding the links of a chain conveyor accurately past a work transfer mechanism, be it a conveyor loading or unloading mechanism, so that work pieces can be accurately positioned in work holders attached to the conveyor links.

While the invention has been described in detail, I do not wish to be limited to the particular embodiment shown and described, and it is my intention to cover hereby all novel adaptations, modifications and arrangements thereof which come within the practice of those skilled in the art to which the invention relates.

What I claim is:

1. A uniform feed device for feeding the individual links of a chain conveyor past a work transfer station for the conveyor, said conveyor having links which secure spaced apart pins each of which have a roller thereon, a first pair of sprockets having teeth in mesh with rollers of said chain, said sprockets being positioned on opposite sides of said work transfer station, a second pair of sprockets having teeth in mesh with rollers of said chain, respective members of said second pair of sprockets being positioned on opposite sides of said first pair of sprockets, said sprockets of said first and second pairs having teeth of the same pitch spacing, and a gear train operatively connecting each of said sprockets through teeth which mesh without backlash producing clearance to cause said sprockets to have the same identical pitch velocity at all times, and whereby tension forces in said chain are isolated from the section of the chain which is moved past said work transfer station.

2. A uniform feed device for the individual links of a chain conveyor each of whose links secure spaced apart pins and each of which pins have a roller thereon, a first pair of sprockets having teeth in mesh with rollers of said chain, said sprockets being spaced apart so that at least one of the rollers of a link being transferred from one of said pair of sprockets tot he other of said pair of sprockets is contacted by at least one tooth of said pair of sprockets at all times during said transfer, a second pair of sprockets having teeth in mesh with said chain, respective members of said second pair of sprockets being positioned on opposite sides of said first pair of sprockets, said sprockets of said first and second pairs having teeth of the same pitch spacing, and a gear train having teeth which mesh without backlash producing clearance operatively connecting each of said sprockets to cause said sprockets to have the same pitch velocity.

3. A uniform feed device for the individual links of a chain conveyor each of whose links secure spaced apart pins and each of which pins have a roller thereon, said device comprising: a first pair of sprockets in mesh with said chain, said sprockets being spaced apart so that a leading and a trailing surface of the rollers supported by one link of said chain will be simultaneously engaged by trailing and leading tooth surfaces of said first pair of sprockets as said link passes from one sprocket to the other sprocket of said pair, a second pair of sprockets in mesh with said chain, respective members of said second pair of sprockets being positioned on opposite sides of said first pair of sprockets, said sprockets having teeth of the same pitch spacing and a gear train having teeth which mesh without backlash producing clearance operatively connecting each of said sprockets to cause said sprockets to have the same pitch velocity.

4. A uniform feed device for feeding the individual links of a chain conveyor past a work transfer station for the conveyor, said conveyor having links which secure spaced apart pins each of which have a roller thereon, a first pair of sprockets having teeth in mesh with rollers of said chain, said sprockets being positioned on opposite sides of said work transfer station, a second pair of sprockets having teeth in mesh with said chain, respective members of said second pair of sprockets being positioned on opposite sides of said first pair of sprockets, said sprockets of said first and second pairs having teeth of the same pitch spacing, and a gear train having teeth which mesh without backlash producing clearance operatively connecting each of said sprockets to cause said sprockets to have the same pitch velocity, one of said second pair of sprockets being the main drive pulley for said chain conveyor, and whereby tension forces in said chain are isolated from the section of the chain which is moved past said work transfer station.

5. A uniform feed device for the individual links of a chain conveyor each of whose links secure spaced-apart pins and each of which pins have a roller thereon, a first pair of sprockets having teeth in mesh with rollers of said chain, said sprockets being spaced apart so that at least one of the rollers of a link being transferred from one of said pair of sprockets to the other of said pair of sprockets is contacted by at least one tooth of said pair of sprockets at all times during said transfer, a second pair of sprockets having teeth in mesh with said chain, respective members of said second pair of sprockets being positioned on opposite sides of said first pair of sprockets, said sprockets of said first and second pairs having teeth of the same pitch spacing, a plurality of drive gears respective ones of which drive respective ones of said sprockets, idler gears respective ones of which are in meshing driving engagement between adjacent ones of said drive gears, each of said idler gears being positioned off of the center line passing through the centers of the drive gears with which the idler gears mesh, and adjustable means for moving said idler gears towards said center lines to remove backlash between said idler and drive gears.

6. A uniform feed device for the individual links of a chain conveyor each of whose links secure spaced-apart pins and each of which pins have a roller thereon, a first pair of sprockets having teeth in mesh with rollers of said chain, said sprockets being spaced apart so that at least one of the rollers of a link being transferred from one of said pair of said sprockets to the other of said pair of sprockets is contacted by at least one tooth of said pair of sprockets at all times during said transfer, a second pair of sprockets having teeth in mesh with said chain, respective members of said second pair of sprockets being positioned on opposite sides of said first pair of sprockets, said sprockets of said first and second pairs having teeth of the same pitch spacing, a plurality of drive gears respective ones of which drive respective ones of said sprockets, idler gears respective ones of which are in meshing driving engagement between adjacent ones of said drive gears, and means for angularly adjusting each drive gear relative to the sprocket which it drives.

7. A uniform feed device for feeding the individual links of a chain conveyor past a work transfer station for the conveyor, said conveyor having links which secure spaced-apart pins each of which have a roller thereon, a first pair of sprockets having teeth in mesh with rollers of said chain, said sprockets being positioned on opposite sides of said work transfer station at such distance that a leading surface of one roller supported by a link is engaged by the trailing surface of a tooth of the leading sprocket of said first pair of sprockets while the trailing surface of the other roller supported by said link is engaged by the leading surface of a tooth of the trailing sprocket of said first pair of sprockets when said link is centered on said work transfer station, a second pair of sprockets having teeth in mesh with said chain, respective members of said second pair of sprockets being positioned on opposite sides of said first pair of sprockets, said sprockets of said first and second pairs having teeth of the same pitch spacing, a plurality of drive gears respective ones of which drive respective ones of said sprockets, idler gears respective ones of which are in meshing driving engagement between adjacent ones of said drive gears, each of said idler gears being positioned off of the center line passing through the centers of the drive gears with which the idler gears mesh, means for angularly adjusting each drive gear relative to the sprocket which it drives, and adjustable means for moving said idler gears towards said center lines to remove backlash between said idler and drive gears.

References Cited by the Examiner

UNITED STATES PATENTS 2,641,351   6/53   Riley _____ 198—203

SAMUEL F. COLEMAN, *Primary Examiner.*

WILLIAM B. LA BORDE, *Examiner.*